United States Patent [19]

Sugishima

[11] Patent Number: 5,218,523

[45] Date of Patent: Jun. 8, 1993

[54] DRIVER CIRCUIT FOR AN INVERTER DEVICE WITH OUTPUT VOLTAGE STABILIZATION DURING START-UP PERIOD

[75] Inventor: Eiichi Sugishima, Nagoya, Japan

[73] Assignee: Mitsubishi Denki Kabushiki Kaisha, Tokyo, Japan

[21] Appl. No.: 741,594

[22] Filed: Aug. 7, 1991

[30] Foreign Application Priority Data

Aug. 8, 1990 [JP] Japan .................. 2-209662

[51] Int. Cl.$^5$ ............................................. H02M 1/08
[52] U.S. Cl. ................................. 363/132; 307/578; 363/49
[58] Field of Search ................. 363/48, 49, 60, 132, 363/131; 307/571, 578

[56] References Cited

U.S. PATENT DOCUMENTS

| | | | |
|---|---|---|---|
| 3,349,313 | 10/1967 | Wilmarth | 363/48 |
| 3,555,398 | 1/1971 | Nestorovic | 363/48 |
| 4,316,243 | 2/1982 | Archer | 307/584 |
| 4,599,555 | 7/1986 | Damiano et al. | 307/571 |
| 4,994,955 | 2/1991 | Schoofs et al. | 363/132 |

FOREIGN PATENT DOCUMENTS 314165 12/1988 Japan .

OTHER PUBLICATIONS

Young, "High-Speed, High-Voltage IC Driver for HEXFET or IGBT Bridge Circuits", International Rectifier Power MOSFET Application Notes, AN-978, pp. 1-8, 1988.

*Primary Examiner*—William H. Beha, Jr.
*Attorney, Agent, or Firm*—Rothwell, Figg, Ernst & Kurz

[57] ABSTRACT

A driver circuit for a half-bridge portion of an inverter device includes a upper arm driver circuit and a lower arm driver circuit for driving a upper arm IGBT and a lower arm IGBT, respectively. The lower arm driver circuit is supplied from a lower arm driver voltage source, while the upper arm driver circuit is supplied from a capacitor, which is charged by the lower arm driver voltage source via a diode and the lower arm IGBT when the lower arm IGBT is turned on. A current limiter is coupled in series with the capacitor to limit the magnitude of the initial charging current of the capacitor while the charge stored across the capacitor is null or small, such that the voltage controller for the lower arm driver voltage source is not disturbed. Alternatively, a pulse generator is provided to generate pulses which repeatedly turn on and off the lower arm driver circuit before the upper arm driver circuit and the lower arm driver circuit are driven complimentarily. In such case, the ON/OFF ratio of the pulses is preferred to increase gradually toward the completion of the initial charging of the capacitor.

7 Claims, 6 Drawing Sheets

FIG. 4
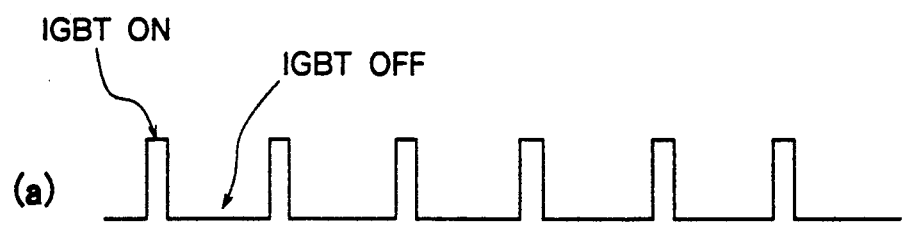
(a)
(b)
(c)

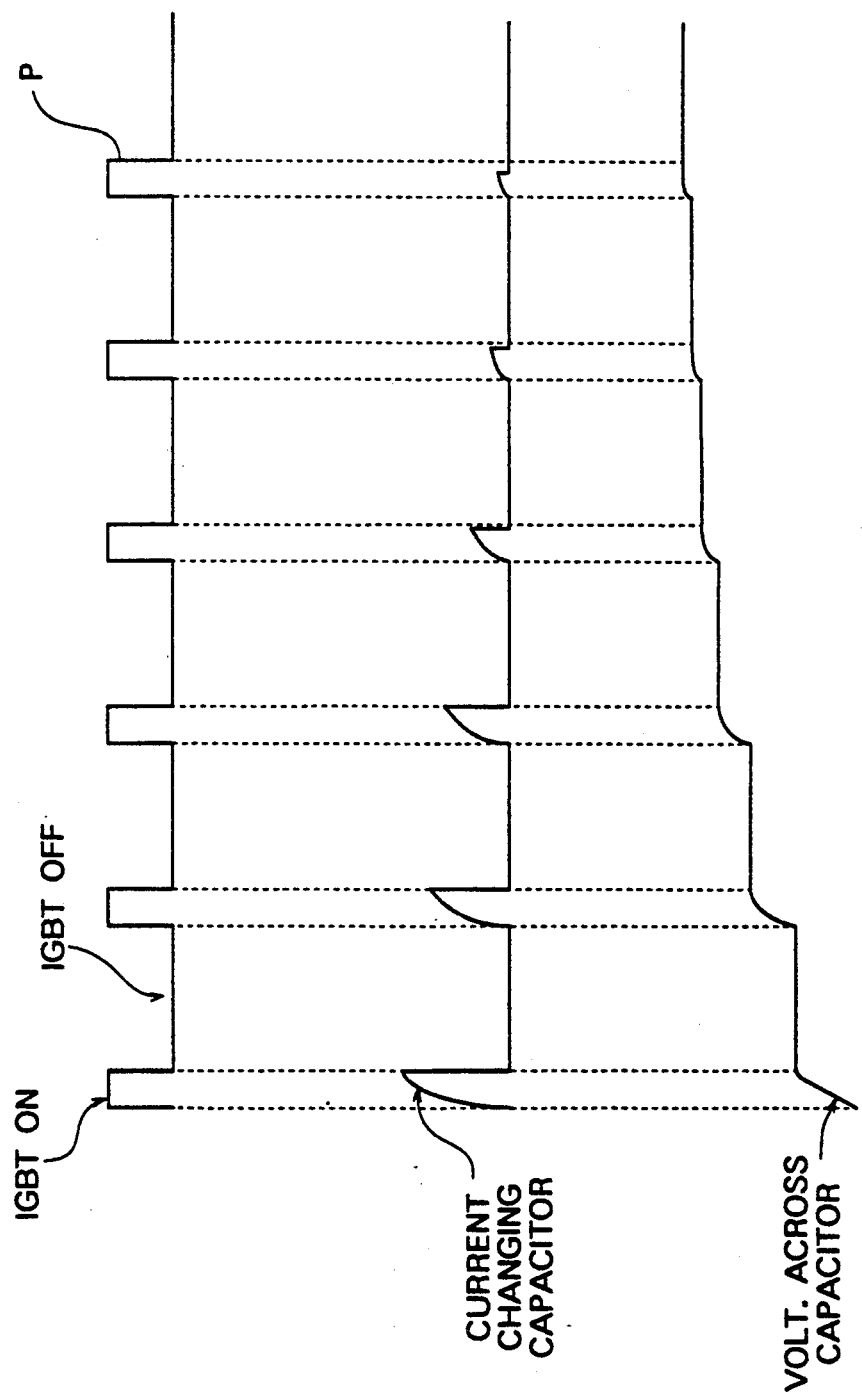

PRIOR ART FIG. 6
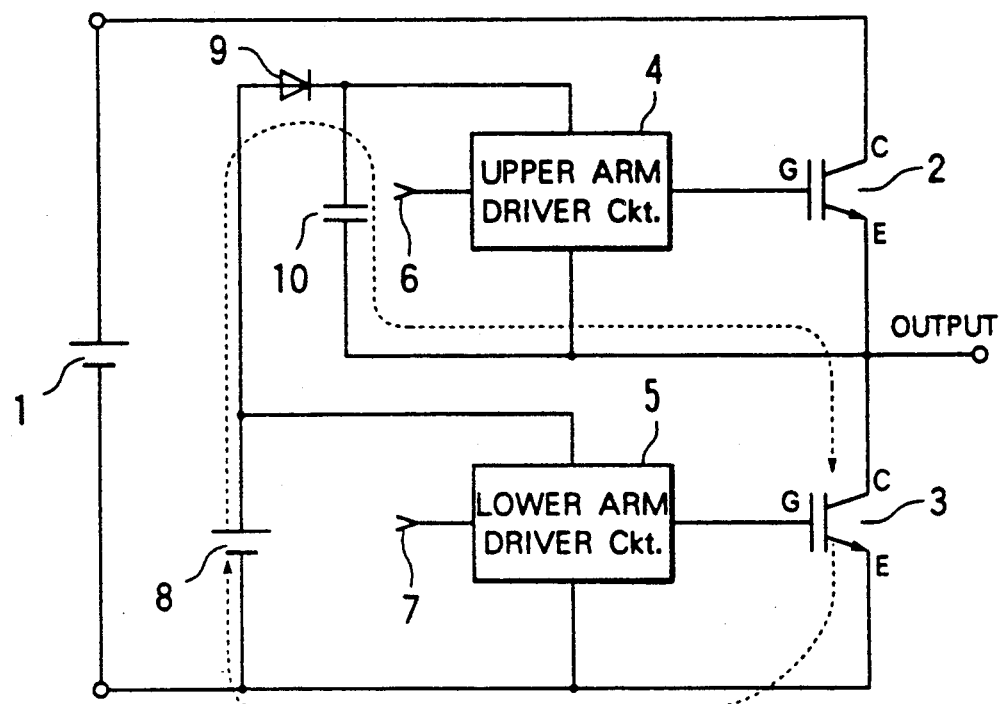
PRIOR ART FIG. 7
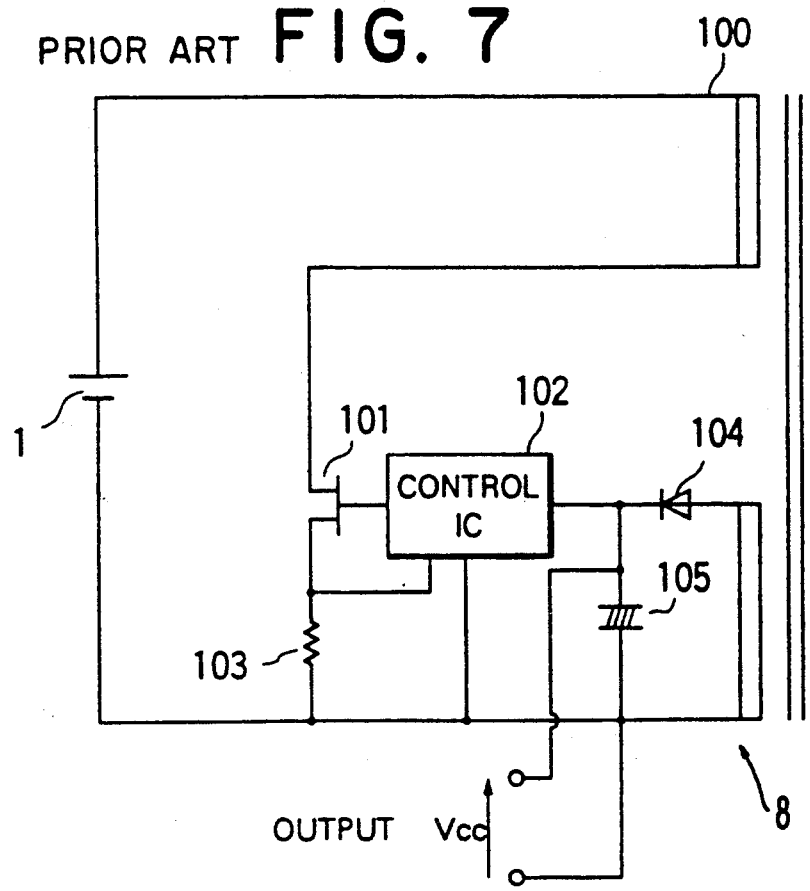

OUTPUT

OUTPUT

DRIVER CIRCUIT FOR AN INVERTER DEVICE WITH OUTPUT VOLTAGE STABILIZATION DURING START-UP PERIOD

BACKGROUND OF THE INVENTION

This invention relates to inverter devices, and more particularly to driver circuits for driving inverter devices wherein charge-pumping type gate driver circuits drive the gates of the semiconductor switching elements (such as IGBTs (Insulated Gate Bipolar Transistor) or MOSFETs) of the inverter circuit.

FIG. 6 is a circuit diagram showing a conventional half-bridge inverter driver circuit. The half-bridge inverter driver circuit of FIG. 6 may be also utilized in combination for driving the single-phase and three-phase inverter circuits shown in FIGS. 8 and 9. FIG. 7 is a circuit diagram showing the circuit organization of the lower arm driver voltage source. The DC power supplied from a DC power source 1 is converted into an AC power by means of the circuit of FIG. 6. Namely, in response to an upper arm ON/OFF signal 6 and a lower arm ON/OFF signal 7, the upper arm driver circuit 4 and the lower arm driver circuit 5 alternately turns on and off the upper arm IGBT 2 and the lower arm IGBT 3, respectively, thereby alternately supplying at the inverter output terminal the positive and the negative voltage of the DC power source 1.

Thus, the lower arm driver circuit 5, supplied from a lower arm driver voltage source 8, turns on and off the lower arm IGBT 3 in response to the lower arm ON/OFF signal 7. More specifically, when the lower arm ON/OFF signal 7 is an ON command, the lower arm driver circuit 5 applies the output voltage of the lower arm driver voltage source 8 on the gate G of the lower arm IGBT 3, thereby turning on the lower arm IGBT 3. On the other hand, when the lower arm ON/OFF signal 7 is an OFF command, the lower arm driver circuit 5 short-circuits between the gate G and the emitter E of the lower arm IGBT 3, to turn off the lower arm IGBT 3.

The ON/OFF of the upper arm IGBT 2 is effected substantially in a similar manner. However, the upper arm driver circuit 4 is supplied from a capacitor 10. Namely, during the time when the lower arm IGBT 3 is turned on, the capacitor 10 is charged by the lower arm driver voltage source 8 via a diode 9 and the lower arm IGBT 3, as indicated by dotted arrows in FIG. 6. The resulting voltage across the capacitor 10 is supplied to the upper arm driver circuit 4 to be applied on the gate G of the upper arm IGBT 2 in response to the upper arm ON/OFF signal 6 when the upper arm IGBT 2 is to be turned on.

The upper arm IGBT 2 and the lower arm IGBT 3 are turned on and off complementarily: they are never turned on simultaneously. Thus, when the lower arm IGBT 3 is turned on, the upper arm IGBT 2 is turned off. During the intervals when the upper arm IGBT 2 is turned off and the lower arm IGBT 3 is turned on, the capacitor 10 is charged by the lower arm driver voltage source 8. When the upper arm ON/OFF signal 6 is an ON command, the upper arm driver circuit 4 applies the voltage of the capacitor 10 across the gate G and the emitter E of the upper arm IGBT 2, thereby turning on the upper arm IGBT 2.

As described above, when the lower arm IGBT 3 is turned on, the output voltage of the lower arm driver voltage source 8 is pumped up to the capacitor 10 via the diode 9 and the lower arm IGBT 3, the capacitor 10 thereby serving as a driver circuit voltage source for the upper arm IGBT 2. This driver circuit system is referred to as the charge-pumping type.

The lower arm driver voltage source 8 is organized as shown in FIG. 7. The current from the DC power source 1 is subjected to a high frequency PWM switching via a power MOSFET 101, which is turned on and off by a control IC 102 for controlling the output voltage $V_{CC}$. Thus, the voltage from the DC power source 1 undergoes DC/DC conversion via a transformer 100, the output of which is rectified via the diode 104 and smoothed via a capacitor 105. The resulting output voltage $V_{CC}$, obtained across the capacitor 105, is supplied to the lower arm driver circuit 5. The control IC 102 controls the output voltage $V_{CC}$ to a predetermined level irrespective of the voltage or output current variations of the DC power source 1. Further, the control IC 102 detects the voltage across the current detector resistor 103 and thereby determines the current flowing through the power MOSFET 101, to suppress an over-current. The control IC 102 thus prevents occurrences of failure of the power MOSFET 101 resulting from an over-current that may flow through the power MOSFET 101 upon building-up of the source voltage 8. Further, by detecting the load current of the lower arm driver voltage source 8 indirectly, the control IC 102 prevents occurrences of failure of the voltage source circuit or a shortening of the life thereof due to an inordinate increase in the load current.

The above conventional driver circuit for an inverter device, however, has the following disadvantage.

When the amount of charge stored in the capacitor 10 is null or small, as when the voltage source 8 is being built-up, the lower arm IGBT 3 is turned on before the upper arm IGBT 2 begins to be turned on and off, to pump up the change from the lower arm driver voltage source 8 to the capacitor 10. Since, however, the load of the lower arm driver voltage source 8 is capacitive during this initial charge period of the capacitor 10, a large current flows through the load to disturb the voltage control system. Thus, the output voltage may become unstable, or an over-current protection circuit may be activated to reduce the output voltage.

SUMMARY OF THE INVENTION

It is therefore an object of this invention to provide a driver circuit for an inverter device by which, even when the amount of charge stored in the capacitor 10 is null or small, as when the voltage source is being built-up and the lower arm IGBT 3 is turned on to pump up the charge to the capacitor 10 from the lower arm driver voltage source 8, the voltage control system is undisturbed and the over-current protection circuit is not activated, such that a stable output voltage of the driver circuit is maintained.

The above object is accomplished in accordance with the principle of this invention by a driver circuit for an inverter device for converting a DC current supplied from a DC power source into an AC current, said inverter device comprising: at least a serial connection of a first and a second switching element coupled across said DC power source; a first and a second driver circuit for complimentarily turning on and off said first and second switching element, respectively; a DC voltage source coupled across said first driver circuit for supplying a switching control voltage to said first switching element; a capacitor coupled in series with said DC voltage source and said first switching element to be charged by said voltage source via said first switching element when said first switching element is turned on, said capacitor being coupled across said second driver circuit for supplying a switching control voltage to said second switching element; and a current limiter element coupled is series with said capacitor and said voltage source.

Preferably, the current limiter element is a resistor, and further preferably the resistance of the resistor decreases from an initial value thereof toward a completion of charging of the capacitor.

Instead of the current limiter element, pulse generator means may be provided for generating pulses to repeatedly turn on and off said first switching element before said second switching element begins to be driven by said second driver circuit, when a charge stored in said capacitor is null or small, thereby charging said capacitor before said first and second switching elements are driven complimentarily. Preferably, the ON/OFF ratio of the pulses generated by said pulse generator gradually increases from an initial to a final stage of charging said capacitor.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 4 shows various waveforms generated by the pulse generator of the circuit of FIG. 3;

FIG. 5 shows a waveform of an output of the pulse generator and the corresponding waveforms of the current that charges the capacitor and the voltage that is developed across the capacitor;

FIG. 6 is a circuit diagram showing a conventional half-bridge inverter driver circuit;

FIG. 7 is a circuit diagram showing the circuit organization of the lower arm driver voltage source;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
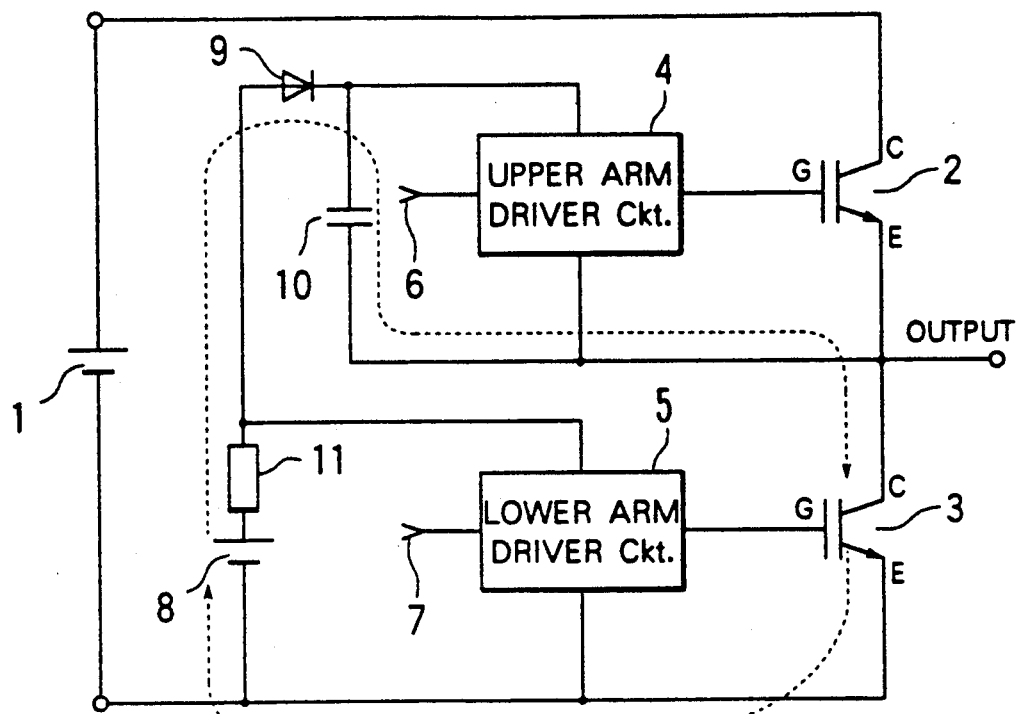
FIG. 1 is a circuit diagram showing a half-bridge inverter driver circuit according to this invention.
Figure 8:
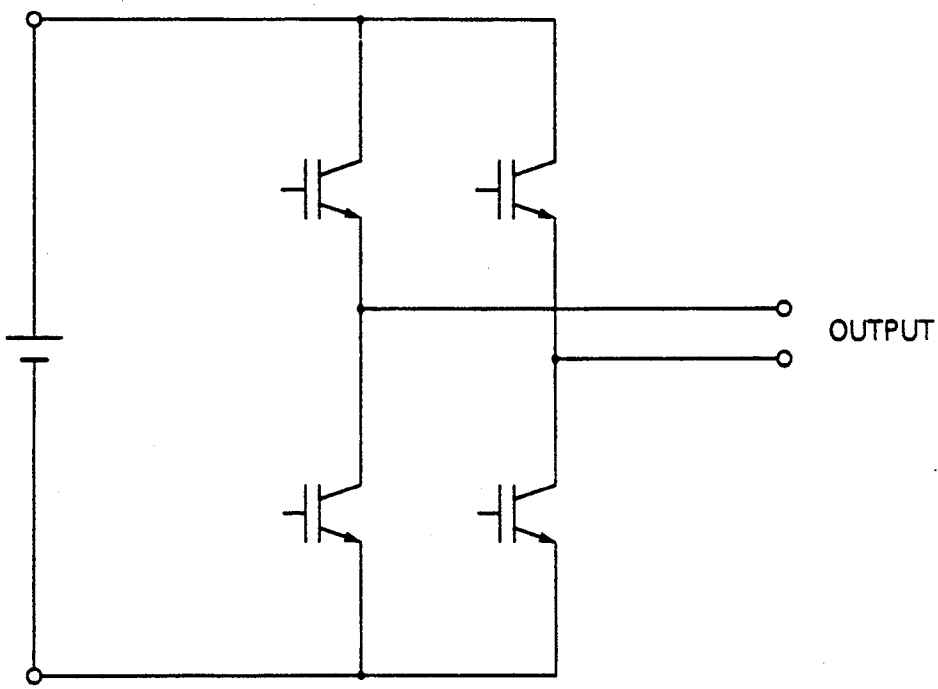
FIG. 8 shows the full-bridge circuit of a single-phase inverter device.
Figure 9:
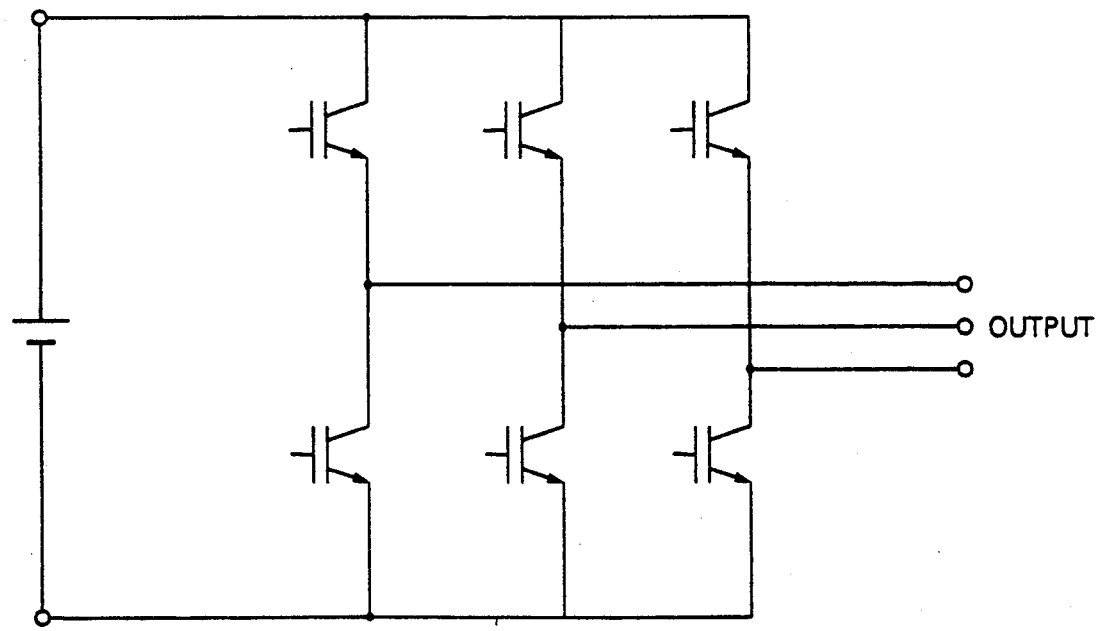
FIG. 9 shows the bridge circuit of a three-phase inverter device.

FIG. 1 is a circuit diagram showing a half-bridge inverter driver circuit according to this invention. It is noted that the circuits may utilized in combination for driving the single-phase or the three-phase full-bridge inverter circuits shown in FIGS. 8 and 9, respectively, to drive an electric motor, etc.

The circuit of FIG. 1 is fundamentally similar to that of FIG. 6. Thus, a DC power source 1 is coupled across serially connected upper arm IGBT 2 and lower arm IGBT 3. The junction point between the emitter E of the upper arm IGBT 2 and the collector C of the lower arm IGBT 3 provides the output voltage of the inverter. An upper arm driver circuit 4 and a lower arm driver circuit 5 drives the upper arm IGBT 2 and the lower arm IGBT 3 in response to an upper arm ON/OFF signal 6 and a lower arm ON/OFF signal 7, respectively. A lower arm driver voltage source 8 is coupled across the lower arm driver circuit 5 to supply a voltage thereto. A diode 9 is coupled at the anode thereof to the positive terminal of the lower arm driver voltage source 8, and at the cathode thereof to the capacitor 10. The capacitor 10 provides a voltage for the upper arm driver circuit 4. The lower arm driver voltage source 8 has a circuit organization as shown in FIG. 7.

Further, according to this invention, a resistor 11, serving as a current limiter, is inserted in series with the lower arm driver voltage source 8 and the capacitor 10. In this particular embodiment, the resistor 11 is inserted between the positive terminal of the lower arm driver voltage source 8 and the junction point at which the lines connected from the lower arm driver voltage source 8 to the diode 9 and the lower arm driver circuit 5 meet.

The method of operation of the circuit of FIG. 1 is fundamentally the same as that of the circuit of FIG. 6. Thus, the following description is limited primarily to the points characteristic to the circuit of FIG. 1.

When the charge stored in the capacitor 10 is null or small, as when building-up the voltage source 8, the lower arm IGBT 3 is first turned on before the upper arm IGBT 2 is turned on and off, so as to pump up the output voltage from the lower arm driver voltage source 8 to the capacitor 10. As described above, if the resistor 11 is not present, a large current flows via the circuit represented by dotted arrows, to disturb the voltage control system for the lower arm driver voltage source 8. However, since the resistor 11 is inserted in series with the capacitor 10, the resistor 11 substantially limits the initial charging current of the capacitor 10, and hence a stable output voltage of the lower arm driver voltage source 8 is maintained.

In the above embodiment, an ordinary resistor 11 is utilized to serve as a current limiter. However, a variable resistor element—commercially available under the trademark POSISTOR—whose resistance gradually decreases from its initial value after a current is passed therethrough may preferably be used as a current limiter. Then, after the initial charging of the capacitor 10 is complete, the voltage drop across the resistor 11 and hence the power loss therein are reduced. Furthermore, the current limiter 11 may be constituted by a reactor.

Figure 2:
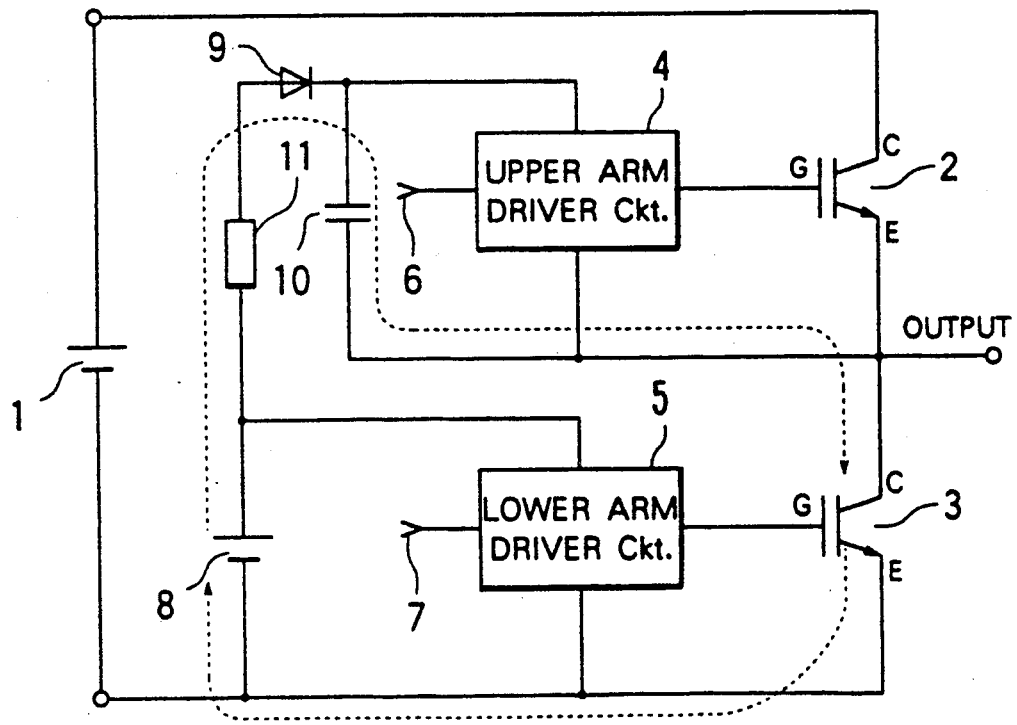
FIG. 2 is a circuit diagram showing a modification of the half-bridge inverter of FIG. 1.

FIG. 2 is a circuit diagram showing a modification of the half-bridge inverter of FIG. 1, where the resistor 11 is inserted between the diode 9 and the junction point at which the lines connected from the lower arm driver voltage source 8 to the lower arm driver circuit 5 and to the diode 9 meet. Since the resistor 11 is coupled in series with the capacitor 10 within the charging circuit for the capacitor 10, the resistor 11 of FIG. 2 accomplishes the same current limiting function as the resistor 11 of FIG. 1.

Figure 3:
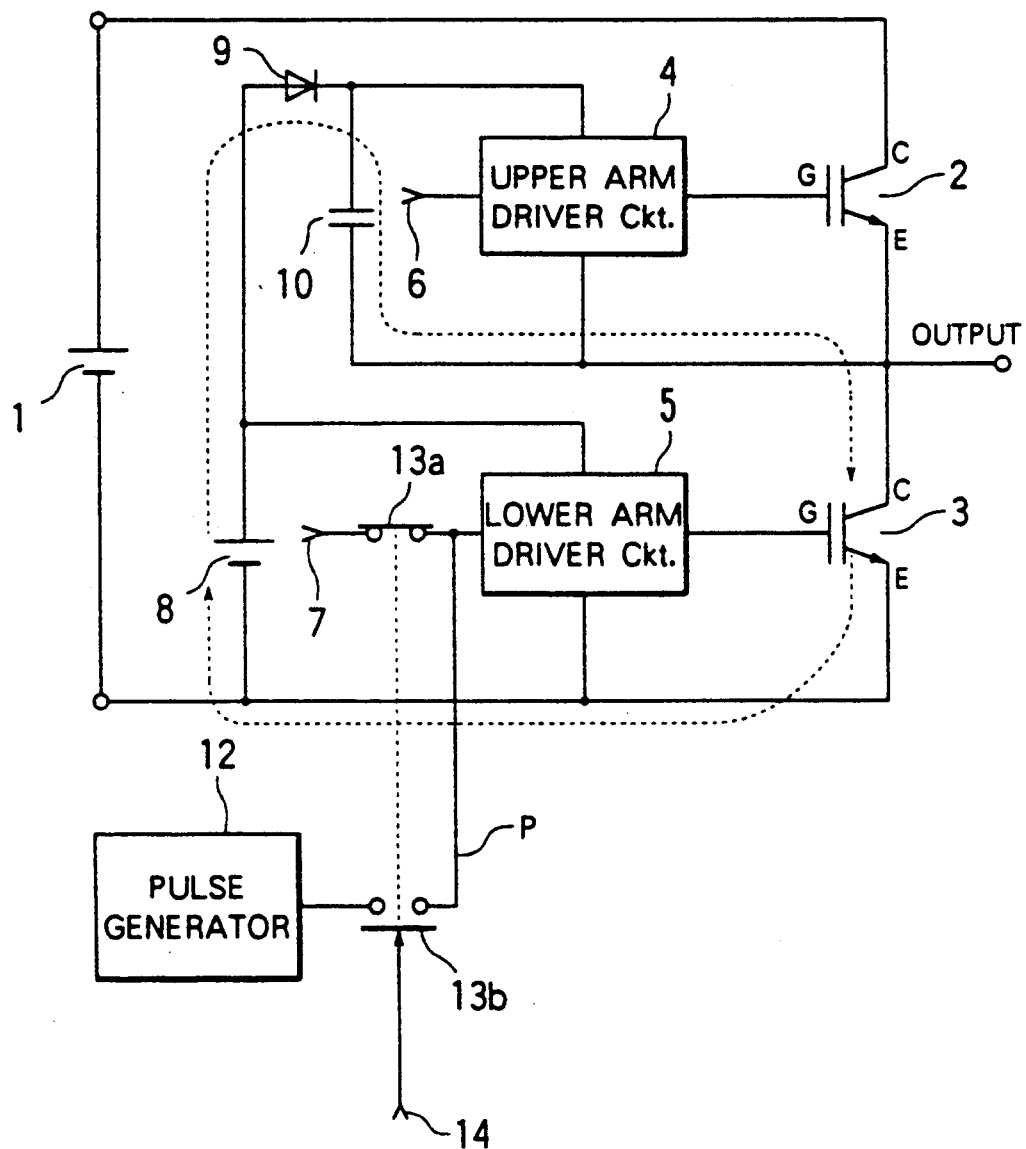
FIG. 3 is a circuit diagram showing another half-bridge inverter driver circuit according to this invention.

FIG. 3 is a circuit diagram showing another half-bridge inverter driver circuit according to this invention. The parts 1 through 10 are the same as those of FIG. 1 or 6 described above. In addition thereto, the circuit of FIG. 3 includes a pulse generator 12, a normally closed contact 13a, and a normally open contact 13b. The lower arm ON/OFF signal 7 is supplied to the lower arm driver circuit 5 via the normally closed contact 13a, and the output of the pulse generator 12 is supplied to the lower arm driver circuit 5 via the normally open contact 13b. The normally closed contact 13a and the normally open contact 13b are interlocked (ganged) and activated in response to an initial charging command signal 14. In response to the initial charging command signal 14, the normally closed contact 13a is opened and the normally open contact 13b is closed.

The method of operation of the circuit of FIG. 3 is similar to that of the circuit of FIG. 6, except for the initial charging operation of the capacitor 10. Further, the half-bridge circuits of FIG. 3 may be combined to drive a single- or three-phase full-bridge inverter circuits of FIGS. 8 and 9, which are utilized, for example, for driving motors.

In the case of the circuit of FIG. 3, the initial charging of the capacitor 10 is effected as follows.

During the initial charging of the capacitor 10, the initial charging command signal 14 is generated (by a control microcomputer of the driver circuit which, by the way, also generates the upper arm ON/OFF signal 6 and the lower arm ON/OFF signal 7). In response to the initial charging command signal 14, the normally closed contact 13a is opened, and the normally open contact 13b is closed, such that the output of the pulse generator 12 is supplied to the lower arm driver circuit 5. Since the output of the pulse generator 12 has a pulse-shaped waveform as shown in FIG. 4 (a), the lower arm IGBT 3 is turned on and off in response to the output of the pulse generator 12. Thus, the current that charges the capacitor 10 flows intermittently, and hence is limited in its magnitude. When the charging of the capacitor 10 is complete, the initial charging command signal 14 ceases, to thereby close the normally closed contact 13a and open the normally open contact 13b. The normal operation thus begins.

FIG. 5 shows a waveform of an output of the pulse generator 12 and the corresponding waveforms of the current that charges the capacitor and the voltage that is developed across the capacitor. As shown clearly in FIG. 5, the current charging the capacitor 10 (the curve at the middle in FIG. 5) during the ON periods of the output P (at the top in FIG. 5) of the pulse generator 12, the peak magnitude of which current is large at first, gradually decreases as the voltage across the capacitor 10 (the curve at the bottom in FIG. 5) increases. Thus, the pulse width of the output of the pulse generator 12 may preferably be gradually increased as shown in FIG. 4 (b), such that the current charging the capacitor 10 can be more effectively limited at the initial charging stage while enhancing the charging efficiency at the final charging stage of the capacitor 10. By modifying the pulse width as shown in FIG. 4 (b), the initial charging current can be effectively limited while the charging of the capacitor 10 can swiftly be completed. The same advantageous effect can also be obtained by gradually decreasing the pulse period of the output of the pulse generator 12, as shown in FIG. 4 (c), while maintaining the pulse width constant. The ON/OFF ratio of the output of the pulse generator 12 is gradually increased in both cases of FIG. 4 (b) and (c), to obtain same advantage.

In the case of the embodiment of FIG. 3, the switching of the lower arm ON/OFF signal 7 and the output of the pulse generator 12 is effected via hardware—the normally closed contact 13a and the normally open contact 13b operated by the initial charging command signal 14. However, the switching of the pulses controlling the lower arm driver circuit 5 may be effected by means of software within the microcomputer for controlling the driver circuit.

Further, in the above embodiments, the IGBTs serve as the switching elements of the inverter device. However, the switching elements may be constituted by any semiconductor switching elements such as power MOSFETs. Furthermore, although a single lower arm driver voltage source 8 supplies the lower arm driver circuit 5, the number of current sources for the lower arm driver circuits may be two or more.

What is claimed is:

1. A driver circuit for an inverter device for converting a DC current supplied from a DC power source into an AC current, said inverter device comprising:
   at least a serial connection of a first and a second switching element coupled across said DC power source;
   a first and a second driver circuit for complimentarily turning on and off said first and second switching element, respectively;
   a DC voltage source coupled across said first driver circuit for supplying a switching control voltage to said first switching element;
   a capacitor coupled in series with said voltage source and said second switching element to be charged by said voltage source via said first switching element when said first switching element is turned on, said capacitor being coupled across said second driver circuit for supplying a switching control voltage to said second switching element; and
   pulse generator means for generating pulses to repeatedly turn on and off said first switching element before said second switching element begins to be driven by said second driver circuit, when a charge stored in said capacitor is null or small, thereby charging said capacitor before said first and second switching elements are driven complimentarily.

2. A driver circuit as claimed in claim 1, wherein an ON/OFF ratio of said pulses generated by said pulse generator gradually increases from an initial to a final stage of charging said capacitor.

3. A driver circuit as claimed in claim 2, wherein a pulse width of said pulses increases to increase the ON/OFF ratio.

4. A driver circuit as claimed in claim 2, wherein a repetition frequency of said pulses increases to increase the ON/OFF ratio.

5. A driver circuit as claimed in claim 2, further including: a normally closed contact and a normally open contact through which an ON/OFF control signal of said first switching element and pulses of said pulse generator are supplied to said first driver circuit, respectively; wherein said normally closed contact is opened and said normally open contact closed when said capacitor is to be charged while a charge stored across the capacitor is small or null.

6. A driver circuit as claimed in claim 1, further comprising a diode coupled in series with said capacitor.

7. A driver circuit as claimed in claim 1, wherein said voltage source comprises a controller circuit for controlling an output voltage thereof, said controller suppressing an over-current flowing from said voltage source.

* * * * *